US012738178B2

(12) United States Patent
Dumur

(10) Patent No.: US 12,738,178 B2
(45) Date of Patent: Sep. 15, 2026

(54) ENGINE FAILURE TRAINING METHOD FOR A HYBRID ROTORCRAFT

(71) Applicant: AIRBUS HELICOPTERS, Marignane Cedex (DE)

(72) Inventor: Guillaume Dumur, Salon de Provence (FR)

(73) Assignee: AIRBUS HELICOPTERS, Marignane Cedex (FR)

( * ) Notice: Subject to any disclaimer, the term of this patent is extended or adjusted under 35 U.S.C. 154(b) by 179 days.

(21) Appl. No.: 18/916,033

(22) Filed: Oct. 15, 2024

(65) Prior Publication Data

US 2025/0182646 A1 Jun. 5, 2025

(30) Foreign Application Priority Data

Nov. 30, 2023 (FR) .................................. FR2313361

(51) Int. Cl.
*G09B 9/46* (2006.01)

(52) U.S. Cl.
CPC ...................................... *G09B 9/46* (2013.01)

(58) Field of Classification Search
None
See application file for complete search history.

(56) References Cited

U.S. PATENT DOCUMENTS

| | | | | |
|---|---|---|---|---|
| 5,873,546 A * | 2/1999 | Evans | G09B 9/46 244/175 |
| 6,917,908 B2 * | 7/2005 | Williams | G09B 9/46 434/35 |
| 8,025,503 B2 * | 9/2011 | Gates | G09B 9/46 434/33 |
| 9,240,126 B2 * | 1/2016 | Beaud | G09B 9/18 |
| 11,560,237 B2 | 1/2023 | Zoppitelli et al. | |
| 2014/0054411 A1 | 2/2014 | Connaulte et al. | |
| 2020/0277072 A1 * | 9/2020 | Zoppitelli | B64D 35/04 |
| 2020/0346744 A1 | 11/2020 | Madeira et al. | |
| 2023/0011896 A1 | 1/2023 | Serr et al. | |
| 2023/0019379 A1 | 1/2023 | Acee et al. | |

FOREIGN PATENT DOCUMENTS

| | | |
|---|---|---|
| CN | 115762292 A | 3/2023 |
| FR | 2994687 A1 | 2/2014 |
| FR | 3090576 A1 | 6/2020 |

OTHER PUBLICATIONS

French Search Report for French Application No. FR2313361, Completed by the French Patent Office, Dated May 15, 2024, 10 pages.

* cited by examiner

*Primary Examiner* — James B Hull
(74) *Attorney, Agent, or Firm* — BROOKS KUSHMAN P.C.

(57) ABSTRACT

A method for simulating an autorotation phase of a simulated rotorcraft. This method comprises a training phase carried out with a training rotorcraft comprising a single training combustion engine for rotating a training lift rotor. The training phase comprises assigning of a stored training value to a regulation limit, by a regulator, and regulation of the training combustion engine, by the regulator, keeping the torque parameter of the training rotorcraft less than or equal to the regulation limit, the training value being less than a nominal value, so that the training combustion engine produces a power equal to a reference power produced by a simulated electric motor.

20 Claims, 1 Drawing Sheet

ENGINE FAILURE TRAINING METHOD FOR A HYBRID ROTORCRAFT

CROSS REFERENCE TO RELATED APPLICATION

This application claims the benefit of FR 23 13361 filed on Nov. 30, 2023, the disclosure of which is incorporated in its entirety by reference herein.

TECHNICAL FIELD

The present disclosure relates to an engine failure training method for a hybrid rotorcraft, and an aircraft applying this method.

BACKGROUND

A rotorcraft conventionally comprises a power plant for setting in motion at least one rotor contributing to its lift. For the sake of convenience, such a rotor is referred to hereinafter as a "lift rotor". For example, a helicopter may comprise a lift rotor and a rear rotor that helps to control the yaw movement of the aircraft.

The power plant may comprise at least one combustion engine. For the sake of convenience, the expression "combustion engine" denotes an engine that requires the combustion of a fuel in order to produce mechanical energy, such as a turboshaft engine or a piston engine, for example. The expression "combustion engine" is used in contrast to the term "electric motor", that describes motors that transform electrical energy into mechanical energy.

If a combustion engine fails on a conventional single-engine rotorcraft, the lift rotor is no longer driven by this combustion engine. The rotation of the lift rotor then undergoes a significant deceleration. The aircraft then needs to be controlled by a pilot to enter an autorotation flight phase in order to limit the reduction in the speed of rotation of the lift rotor.

This entry into the autorotation flight phase must be made within a very short time, in the region of 1 to 2 seconds after the combustion engine has failed, in order to maintain an acceptable speed of rotation of the lift rotor. An autorotation flight phase is a particular flight phase wherein the aircraft flies in a descending direction without driving power.

On a helicopter of the type described above, the lift rotor is then rotated by the relative wind. The lift rotor provides sufficient stabilized lift to brake and control the descent of the aircraft until it lands. In order to apply this particular piloting procedure, the pilot needs to enter the autorotation phase by quickly reducing the collective pitch of the blades of the lift rotor in order to keep the speed of rotation of the lift rotor within permissible limits.

This particular procedure calls for a high degree of accuracy and appropriate, recurrent training for the pilot of the aircraft. Carrying out such training is challenging. During such training, a pilot places the combustion engine in an idle rating in order to simulate the engine failure, said engine then being piloted at a minimum power that is not sufficient to supply power to the rotor. For example, the pilot moves a throttle to an idle mechanical stop, or sets an idle rating via a switch linked to the control unit of the engine.

Solutions have been proposed to assist the pilot of a single-engine rotorcraft by providing additional energy for carrying out an autorotation flight phase.

Document FR 2994687 describes an aircraft having a gearbox that sets at least one main lift rotor in motion.

According to said document, the operation of the combustion engine setting the gearbox in motion is monitored during flight in order to detect a failure. When a failure is detected in the combustion engine, an electric motor is controlled to supply auxiliary power to the main lift rotor. This supply of auxiliary power makes it possible to reduce the deceleration of the main lift rotor, giving the pilot greater maneuvering flexibility. The pilot is then able to enter the autorotation flight phase of the aircraft more quickly and easily.

Document FR 3 090 576 also describes a method for assisting a pilot of a single-engine rotary-wing aircraft during an autorotation flight phase, by engaging an electric motor.

Using an auxiliary electric motor to facilitate the work of a pilot when there is an engine failure in a single-engine rotorcraft is advantageous. However, training a pilot for this autorotation phase may be complex. Indeed, only aircraft equipped with such an electric motor can be used to train a pilot for the failure of the combustion engine on such a type of aircraft.

Furthermore, the sources of electrical energy of an aircraft of this type do not allow many successive training exercises to be carried out on the same flight. The pilot needs to return to base to recharge or change electric batteries in order to carry out several training exercises.

Documents relating to combustion engine failure training for an aircraft comprising several combustion engines operating differently are far removed from this problem.

For example, document US20230019379 describes combustion engine failure training for an aircraft provided with several different combustion engines. The aircraft comprises a main engine and an additional, less powerful, powertrain. During a training exercise, the additional powertrain supplies a first power less than the emergency power to be produced in the event of an actual failure of the main engine, and the main engine is idled so that the sum of the power produced by the main engine and the power produced by the additional powertrain is equal to the emergency power.

Patent application CN 115762292 describes a system for controlling the engines of a helicopter intended to provide autorotation training for pilots. Documents US2023011896 and US2020346744 have also been cited.

SUMMARY

An object of the present disclosure is thus to propose a method for training a pilot for an engine failure that may occur on a single-engine rotorcraft having a rotary wing, this single-engine aircraft having an electric assistance motor that can supply additional power to the rotary wing during the autorotation phase.

The disclosure thus relates to a method for simulating an autorotation phase that may occur on a simulated rotorcraft. The simulated rotorcraft comprises single simulated combustion engine for rotating a simulated lift rotor when no failure has occurred and a simulated electric motor for rotating said simulated lift rotor during said autorotation phase.

The term "simulated" is associated with objects whose operation is to be simulated. The method therefore aims to simulate, with various types of rotorcraft, the operation of a rotorcraft referred to as a "simulated rotorcraft" having a single combustion engine for rotating a lift rotor when no failure has occurred, and an electric motor for automatically supplying engine torque to the lift rotor during an autorotation phase, if required.

The term "training", on the other hand, is associated with objects of a rotorcraft used to simulate such behavior and to which the present method is applied. The training rotorcraft may be different from or identical to the simulated rotorcraft.

This method comprises a training phase carried out with a training rotorcraft, the training rotorcraft comprising a single training combustion engine for rotating a training lift rotor, the training combustion engine being regulated by a regulator of a control system, keeping a torque parameter of the training rotorcraft less than or equal to a regulation limit, the training phase comprising:

- activation of the training phase by operating a human-machine entry interface of the control system; and
- in response to said activation, assigning of a stored training value to the regulation limit, by the regulator, and regulation of the training combustion engine by the regulator, keeping the torque parameter of the training rotorcraft less than or equal to the regulation limit, said training value being less than a nominal value assigned to the regulation limit prior to said activation, so that the training combustion engine produces a power equal to a reference power produced by the simulated electric motor during an autorotation phase in the simulated rotorcraft.

The term "assigning" means that the parameter in question becomes equal to the value in question.

As a result, this method does not use an electric motor to simulate the desired behavior. According to this method, during the training phase, the regulator reduces the value of the regulation limit of the training combustion engine, assigning to it the predetermined training value instead of the nominal value.

Therefore, the training value being far less than the nominal value, for example in order for the combustion engine to produce power in the region of 20% of the power produced before the training phase, the torque parameter becomes greater than the regulation limit. The regulator consequently closes the metering valve supplying fuel to the training combustion engine. The power produced by the training combustion engine will then decrease. The training value is defined so that the training combustion engine supplies power substantially equal to the reference power of the simulated electric motor. This reference power may be a maximum power, for example. The expression "power equal to a reference power" means that the training combustion engine supplies power equal to the reference power of the simulated electric motor, within a safety margin, for example plus or minus 10%.

The training rotorcraft therefore behaves in a similar manner to the simulated rotorcraft when the simulated combustion engine fails and the simulated electric motor takes over.

This method can be used to simulate, in particular, the start of an autorotation phase on such a simulated rotorcraft, without the need to use an electric motor, or indeed on another type of rotorcraft. Therefore, the training exercise may be carried out many times in succession during a single session without using electric motor, surprisingly on both a conventional rotorcraft that has no such electric motor and on a rotorcraft comprising autorotation assistance having such an electric motor.

The method may further comprise one or more of the following features, taken individually or in combination.

According to one possibility, the torque parameter may be a driving power or an engine torque transmitted to a component of the training rotorcraft.

For example, the torque parameter is measured on a shaft of the combustion engine. It is therefore possible to determine, by calculations, tests or simulations, for example, the value that the torque parameter needs to have in order to supply the training lift rotor with substantially the same power as when using the simulated electric motor.

According to one possibility compatible with the preceding possibilities, the training rotorcraft may comprise a training electric motor capable of setting said training lift rotor in rotation and not used during the training phase or may comprise only the training combustion engine for setting the training lift rotor in motion.

The training rotorcraft may be identical to the simulated rotorcraft. In this case, the electric motor does not need to be used in order to be simulated, allowing the training phase to be carried several times on the same flight without needing to recharge the electric batteries of the aircraft.

Alternatively, the training rotorcraft may be a conventional rotorcraft that is surprisingly capable of simulating entry into an autorotation phase in the simulated rotorcraft.

According to one possibility compatible with the preceding possibilities, the regulation of the training combustion engine may comprise regulating the training combustion engine by applying a dedicated regulation law to the training phase, and inhibiting this regulation law as long as the torque parameter is greater than or equal to the training value.

The regulator is configured to apply a control law in order to determine an order to transmit to the fuel metering valve. When not in the training phase, the control law takes the form of a conventional nominal law. During the training phase, the nominal law is replaced by the dedicated regulation law. This dedicated regulation law may be of the same type as the regulation law of the simulated electric motor. For example, the regulator applies the regulation law described in document FR 2 994 687 or document FR 3 090 576.

According to one possibility compatible with the preceding possibilities, the training rotorcraft may comprise a control system instrument displaying an operating limit determined by a display law as a function of the nominal value, the training phase comprising replacing the nominal value with the training value in order to determine the operating limit.

By way of illustration, the training rotorcraft comprises a first-limitation instrument. This instrument considers several monitoring parameters and their limits. With respect to the torque parameter, this instrument takes the training value into consideration during the training phase, instead of the nominal value.

According to one possibility compatible with the preceding possibilities, said regulation of said training combustion engine may comprise keeping the current power produced by the training combustion engine greater than the power achieved at an idle rating.

The training combustion engine is therefore not idled in order to simulate the operation of an electric assistance motor, for example producing sufficient non-zero power to rotate the rotor, unlike the procedure described above applied to a conventional single-engine rotorcraft.

According to one possibility compatible with the preceding possibilities, the training phase may comprise displaying at least one of the following items of information: an indication of an action to be carried out on a collective pitch of blades of the training lift rotor; a current speed of rotation of said training lift rotor; a target speed of rotation of said training lift rotor; a simulated state of charge, simulated as a f function of an operating time period of the training combustion engine and successive values of the torque parameter during this operating time period during the training phase, of a simulated electric battery supplying electricity to the simulated electric motor; and a symbol illustrating the implementation of the training phase.

According to one possibility compatible with the preceding possibilities, the method may comprise exiting the training phase, said regulation limit being equal to the nominal value after exiting the training phase.

Exiting the training phase represents a transition phase for returning the rotorcraft to the normal conditions in place prior to the training phase.

According to one possibility compatible with the preceding possibilities, the method may comprise operating a human-machine exit interface of the control system, exiting the training phase being carried out in response to said operating of the human-machine exit interface.

A pilot may therefore manually exit the training phase.

According to one possibility compatible with the preceding possibilities, exiting the training phase may be engaged automatically:

- when the speed of rotation of the training lift rotor is less than a first speed threshold and, at the same time, the height of the training rotorcraft is greater than a height threshold; or
- when the speed of rotation of the training lift rotor is less than or equal to a second speed threshold and, at the same time, the height of the training rotorcraft is less than or equal to the height threshold, the first speed threshold being greater than the second speed threshold.

For example, the first speed threshold may be a predetermined threshold. The first speed threshold may also be entered in the aircraft's flight manual for this procedure.

For example, the height threshold may be a predetermined threshold. For example, the height threshold is set higher than the height of a high point of the aircraft's height-velocity diagram. The height-velocity diagram is a graph showing the safe and dangerous flight zones for a specific aircraft and, for example, a helicopter. Said high point is the highest point associated with a zone to be avoided.

For example, the second speed threshold may be in the region of 75% of a predetermined nominal speed.

Therefore, the regulation system may automatically exit the training phase as a function of the speed of rotation of the training lift rotor and the height of the training rotorcraft.

Indeed, when entering the autorotation flight phase, if the speed of rotation of the training lift rotor drops below the first speed threshold, the pilot has not succeeded in entering this autorotation phase in the required manner. The training phase therefore needs to be stopped in order for the training combustion engine to supply sufficient power to safely rotate the training lift rotor. Entry into the autorotation phase generally takes place at a height greater than the height threshold from the ground.

Conversely, immediately before landing, and therefore when close to the ground, the pilot needs to increase the collective pitch of the blades of the training lift rotor in order to reduce the speed of descent of the training rotorcraft. This action also has the effect of significantly reducing the speed of rotation of the training lift rotor. However, this speed of rotation of the training lift rotor needs to remain higher than the second speed threshold in order for the training lift rotor to supply sufficient lift. This landing phase takes place close to the ground, the height of the training rotorcraft in relation to the ground being less than or equal to the height threshold.

The automatic and manual exit modes may be available on the same rotorcraft.

According to one possibility compatible with the preceding possibilities, exiting the training phase may comprise assigning, to the regulation limit, a value that increases, during a transition phase, from the training value to the nominal value, according to a predetermined transition law.

This feature makes it possible to gradually increase the regulation limit of the training combustion engine, thus avoiding too sudden change in this regulation limit, so as to protect the mechanical transmission system linking the training combustion engine to the training lift rotor and/or to avoid distracting the pilot with a potential yaw jerk.

Apart from a method, the present disclosure relates to a computer program comprising instructions that, when said program is run by a control system, cause said control system to implement this method.

The present disclosure also relates to a rotorcraft implementing this method. The present disclosure relates to a training rotorcraft for training a pilot to enter an autorotation phase following an engine failure in a simulated rotorcraft, the training rotorcraft comprising a single training combustion engine for rotating a training lift rotor. This training rotorcraft comprises a control system configured to implement this method.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

The disclosure relates to a simulation method, and to a computer program and a training rotorcraft capable of implementing this method.

Figure 1:
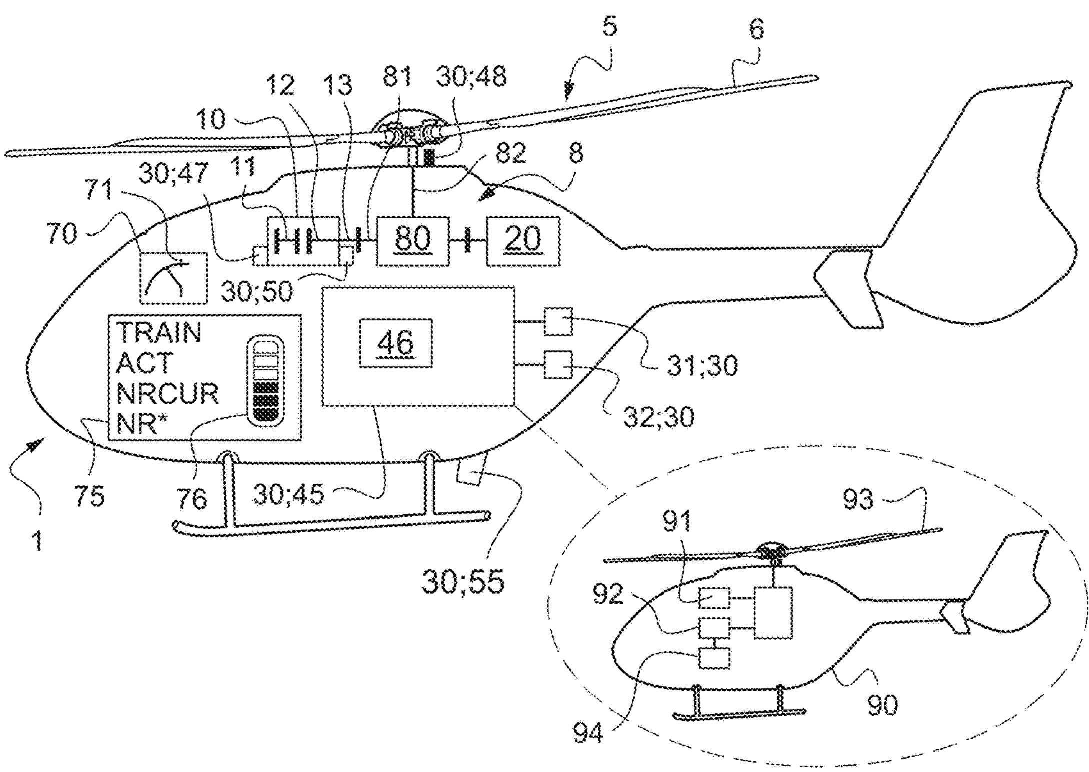
FIG. 1 is a schematic view showing a training rotorcraft capable of simulating the autorotation operation of a simulated rotorcraft.

According to FIG. 1, such a training rotorcraft 1 comprises at least one lift rotor, referred to as the training lift rotor 5. This training lift rotor 5 contributes, in particular, to the lift of the training rotorcraft 1. For example, the training rotorcraft 1 is a helicopter.

The training lift rotor 5 comprises at least one blade 6. Moreover, the training rotorcraft 1 may comprise a pitch modification system for modifying the pitch of the blade or blades 6 on command, in particular a collective pitch component, for example. Such a pitch modification system may be of a conventional type and is not shown in detail so as not to unduly clutter FIG. 1. Such a pitch modification system is known to a person skilled in the art and may comprise, for example, a set of swashplates linked to each blade 6 by a pitch rod.

The training rotorcraft 1 also comprises a single combustion engine, referred to as the training combustion engine 10, for rotating the training lift rotor 5. The training combustion engine 10 comprises a power shaft 13.

According to the example shown, the training combustion engine 10 may comprise a gas generator 11 followed by a power turbine 12 kinematically linked to the power shaft 13. Alternatively, the training combustion engine 10 may comprise a piston engine.

Irrespective of the nature of the training combustion engine 10, the power shaft 13 may be connected to a power transmission system 8 that is connected to the training lift rotor 5. For example, the power transmission system 8 may in particular comprise a main gearbox 80. The main gearbox 80 may comprise a first input shaft 81 directly or indirectly connected to the power shaft 13, and/or a rotor mast 82 directly or indirectly connected to the training lift rotor 5.

The training rotorcraft 1 may possibly comprise a training electric motor 20 that can help rotate the training lift rotor 5 on an ad hoc basis. According to the example shown, such a training electric motor 20 may be connected to an input shaft of the gearbox 80. Such a training electric motor 20 is optional. The training electric motor 20 may be an electric machine capable of operating in motor and electrical power generation modes or may only operate in motor mode.

Moreover, the training rotorcraft 1 is equipped with a control system 30 configured to allow the simulation of an autorotation phase taking place on a simulated rotorcraft 90. The training rotorcraft 1 can therefore be used to simulate the behavior of a particular rotorcraft referred to as a "simulated rotorcraft 90", that is depicted as a smaller craft in a dashed bubble for illustrative purposes. This simulated rotorcraft 90, the operation of which is to be simulated with the training rotorcraft 1, comprises a single simulated combustion engine 91 for rotating a simulated lift rotor 93 when no failure has occurred and a simulated electric motor 92 for rotating said simulated lift rotor 93 during said autorotation phase. The performances of the simulated rotorcraft 90 are known.

The control system 30 may in particular comprise a computer program 46 comprising instructions that, when the computer program 46 is run, cause the control system 30 to implement the simulation method described below.

In particular, the control system 30 comprises a regulator 45. The regulator 45 may comprise one or more computers that may or may not be dedicated to this application and capable of applying said computer program 46. The term "computer" denotes a unit that may comprise, for example, at least one processor and at least one memory, at least one integrated circuit, at least one programmable system, or at least one logic circuit, these examples not limiting the scope given to the expression "computer". The term "processor" may refer equally to a central processing unit or CPU, a graphics processing unit or GPU, a digital signal processor or DSP, a microcontroller, etc. For example, the regulator 45 comprises a computer known as an engine control unit.

The regulator 45 may control a metering valve 47 of the control system 30. The metering valve 47 controls the flow rate of fuel that supplies the training combustion engine 10. To this end, the regulator 45 applies stored laws in order to transmit a control signal to the metering valve 47 as a function of input data supplied by conventional sensors. For example, the regulator 45 communicates with a speed sensor 48 evaluating a current speed of rotation NGCUR of the training lift rotor 5 and/or a torque sensor 50 evaluating the engine torque produced by the training combustion engine 10, and/or a height sensor 55 measuring the height of the training rotorcraft 1 in relation to an overflown surface. These sensors of the control system 30 are of a conventional type known to a person skilled in the art. For example, the height sensor comprises a radio altimeter, the torque sensor comprises a torquemeter, and the speed sensor comprises a position sensor and a derivator.

The regulator 45 may control the metering valve 47 to make the speed of rotation of the training lift rotor 5 or the power shaft 13 tend towards a speed setpoint, for example.

In addition, the regulator 45 controls the metering valve 47 to ensure it does not exceed pre-established regulation limits of the training combustion engine 10 or of the power transmission system 8. The training combustion engine 10 is thus regulated by the regulator 45 to ensure that a torque parameter of the training rotorcraft 1 is less than or equal to a regulation limit. The torque parameter is a driving power or an engine torque in a component of the training rotorcraft 1, for example at the power shaft 13, the first input shaft 81, the rotor mast 82 or a gearwheel of the gearbox 80.

Moreover, the regulator 45 may communicate with an instrument 70. Such an instrument 70 may be configured to display an operating limit 71 determined with a display law as a function, in particular, of the regulation limit, or other limits such as a temperature limit or rotational speed limit of the combustion engine. For example, this instrument 70 is referred to as a first-limitation instrument or FLI and displays a mark relating to an operating limit carrying the monitored parameter that is closest to its limit.

Moreover, the regulator 45 may communicate with a display 75. This display 75 may comprise one or more screens for displaying one or more items of data described hereinafter.

Finally, the regulator 45 may be in wired or wireless communication with a human-machine entry interface 31 and/or a human-machine exit interface 32. These interfaces 31, 32 may constitute one and the same interface. For example, a two-position knob represents the human-machine entry interface 31 when the knob is in a first position and the human-machine exit interface 32 when the knob is in a second position.

Figure 2:
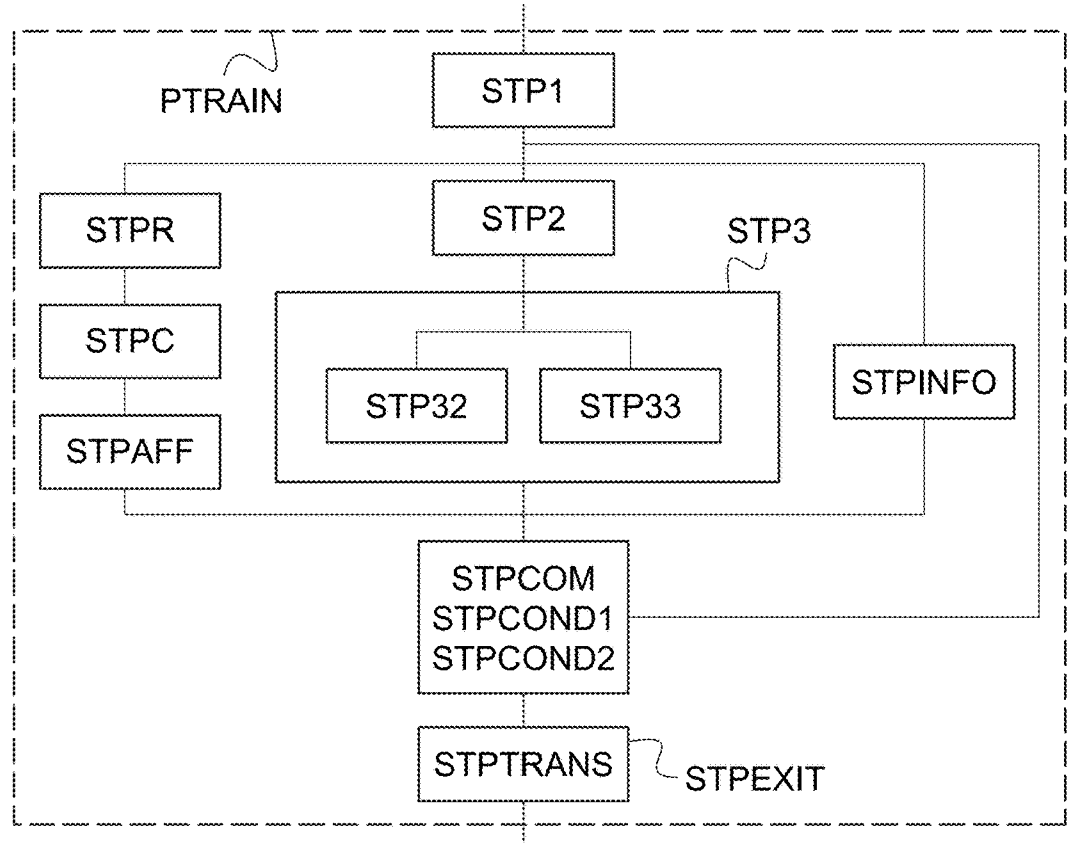
FIG. 2 is a schematic view showing the simulation method of the disclosure.

FIG. 2 shows the simulation method of the disclosure, this method being able to be implemented by the training rotorcraft 1 of FIG. 1, for example.

During flight, the regulator 45 controls the training combustion engine 10, via the metering valve 47, so that the training lift rotor 5 rotates at a nominal speed of rotation. The regulator 45 is configured to control the metering valve 47 by applying a control law in the form of a nominal law, and ensuring that the torque parameter does not exceed the regulation limit. The regulation limit is then equal to a nominal value.

The method comprises activating STP1 the training phase PTRAIN by operating the human-machine entry interface 31. This human-machine entry interface 31 transmits an analog or digital signal to the regulator 45. This signal carries an order to initiate the training phase PTRAIN.

In response to this activation STP1, the simulation method comprises assigning STP2 a stored training value to the regulation limit. The regulator 45 is configured such that the regulation limit becomes equal to the training value and no longer to the nominal value. The training value is less than this nominal value.

The simulation method then comprises regulating STP3 the training combustion engine 10 by keeping the torque parameter of the training rotorcraft 1 less than or equal to the new value of the regulation limit, i.e., the training value.

The regulator 45 may in particular control the training combustion engine 10 by placing it in a rating different from the idle rating, in order to produce more power than is produced under an idle rating.

In particular, this step STP3 of regulating the training combustion engine 10 may comprise regulating STP32 the training combustion engine 10 by no longer assigning to the control law the nominal law, but rather assigning to it a regulation law dedicated to the training phase PTRAIN, and inhibiting STP33 this dedicated regulation law as long as the torque parameter is greater than or equal to the training value.

As long as the torque parameter is less than the training value, the regulator 45 may use the dedicated regulation law to determine the position of the fuel metering valve 47 to be reached. This dedicated regulation law may be similar or identical to the law regulating the simulated electric motor 92. When the torque parameter is greater than or equal to the training value, the regulator 45 may close the metering valve 47, in which case no fuel flow is supplied to the training combustion engine 10.

Therefore, when the training phase STP1 is activated, the regulation limit is suddenly reduced significantly. The torque parameter becomes greater than the regulation limit, that is now equal to the training value, causing the fuel metering valve 47 to close. The power produced by the training combustion engine 10 drops suddenly, resulting in a reduction in the speed of rotation of the training lift rotor 5. When the torque parameter reaches the training value, the training combustion engine 10 is then regulated by the regulator 45 in a manner substantially equivalent to the simulated electric motor 92.

This method can therefore be used to simulate the behavior of the simulated rotorcraft 90 with a training rotorcraft 1, even though it may or may not be provided with an electric motor.

At the same time, or afterwards, if applicable, the method may comprise replacing STPR the nominal value with the training value in the instrument 70. The simulation method then comprises determining STPC the operating limit with the instrument 70, using a new limit value for the torque parameter when applying the stored display law. During a step STPAFF, the method comprises displaying the operating limit calculated by taking into account not the nominal value initially assigned to the torque parameter, but the training value.

At the same time, or afterwards, if applicable, the method may comprise displaying STPINFO at least one item of information on the display 75.

Such information may be an indication ACT of action to be carried out on the collective pitch of blades 6 of the training lift rotor 5. For example, the regulator may transmit a signal to the display 75 to: request the display of a symbol indicating that the collective pitch needs to be increased if the current speed of rotation of the training lift rotor 5 is greater than a high threshold, a symbol indicating that the collective pitch needs to be decreased if the current speed of rotation of the training lift rotor 5 is less than a low threshold, the low threshold being less than the high threshold, a symbol indicating that the collective pitch needs to be maintained if the current speed of rotation of the training lift rotor lies between the low threshold and the high threshold, threshold values included.

Such information may be the current speed of rotation NRCUR of the training lift rotor 5 measured with the speed sensor and transmitted directly or via the regulator 45.

Such information may be a target speed of rotation NR* of said training lift rotor 5 established or stored by the regulator 45.

Such information may be a simulated state of charge 86 of a simulated electric battery 94, this state of charge 86 being calculated by the regulator 45 as a function of an operating time period of the training combustion engine 10 and successive values of the torque parameter during this operating time period.

Such information may be illustrated by a symbol TRAIN signaling the implementation of the training phase PTRAIN, the human-machine entry interface 31 or the regulator 45 transmitting an analog or digital signal carrying this information to the display 75.

Moreover, the method may comprise a testing step for evaluating whether the training phase needs to be interrupted and whether this training phase needs to be exited STPEXIT. The exit STPEXIT from the training phase may be initiated by the regulator 45 when:

- the human-machine exit interface 32 is operated STPCOM, this human-machine exit interface 32 sending an analog or digital signal carrying the requested stop to the regulator 45;
- the regulator 45 determines STPCOND1 that the speed of rotation of the training lift rotor 5 is less than a first speed threshold, that is predetermined or stored in the regulator 45, and, at the same time, the height of the training rotorcraft 1 is greater than a height threshold, that is predetermined or stored in the regulator 45; or
- the regulator 45 determines STPCOND2 that the speed of rotation of the training lift rotor 5 is less than a second speed threshold and, at the same time, the height of the training rotorcraft 1 is less than or equal to the height threshold, the first speed threshold being greater than the second speed threshold.

At the end of the exit phase, the regulator 45 assigns the nominal value to the regulation limit after a transition period and may apply the nominal law applied prior to the training phase.

Alternatively, during a transitional period, the exit step STPEXIT may comprise assigning STPTRANS to the regulation limit a value that increases from the training value to the nominal value, according to a predetermined transition law. The regulation law dedicated to the training phase, the nominal regulation law used before or after the training phase or another law may be applied by the regulator 45, while limiting the power produced by the training combustion engine 10 by keeping the torque parameter less than or equal to the regulation limit.

Naturally, the present disclosure is subject to numerous variations. It is naturally possible to replace any of the means described with equivalent means without going beyond the ambit of the present disclosure.

What is claimed is:

1. A method for simulating an autorotation phase on a simulated rotorcraft comprising a single simulated combustion engine for rotating a simulated lift rotor when no failure has occurred and a simulated electric motor for rotating the simulated lift rotor during the autorotation phase, wherein the method comprises a training phase carried out with a training rotorcraft, the training rotorcraft comprising a single training combustion engine for rotating a training lift rotor, the training combustion engine being regulated by a regulator of a control system, keeping a torque parameter of the training rotorcraft less than or equal to a regulation limit, the training phase comprising:

activation of the training phase by operating a human-machine entry interface of the control system; and in response to the activation, assigning of a stored training value to the regulation limit, by the regulator, and regulation of the training combustion engine by the regulator, keeping the torque parameter of the training rotorcraft less than or equal to the regulation limit, the training value being less than a nominal value assigned to the regulation limit prior to the activation, so that the training combustion engine produces a power equal to a reference power produced by the simulated electric motor during an autorotation phase in the simulated rotorcraft.

2. The method according to claim 1, wherein the torque parameter is a driving power or an engine torque transmitted to a component of the training rotorcraft.

3. The method according to claim 1, wherein the training rotorcraft comprises a training electric motor capable of setting the training lift rotor in rotation and not used during the training phase or comprises only the training combustion engine for setting the training lift rotor in motion.

4. The method according to claim 1, wherein the regulation of the training combustion engine comprises regulating the training combustion engine by applying a dedicated regulation law to the training phase, and inhibiting this regulation law as long as the torque parameter is greater than or equal to the training value.

5. The method according to claim 1, wherein the training rotorcraft comprises an instrument of the control system displaying an operating limit determined, when not in the training phase, by a display law as a function of the nominal value, the training phase comprising replacing the nominal value with the training value in order to determine the operating limit.

6. The method according to claim 1, wherein the regulation of the training combustion engine comprises keeping the current power produced by the training combustion engine greater than the power achieved at an idle rating.

7. The method according to claim 1, wherein the training phase comprises displaying at least one of the following items of information: an indication of an action to be carried out on a collective pitch of blades of the training lift rotor; a current speed of rotation of the training lift rotor; a target speed of rotation of the training lift rotor; a simulated state of charge, simulated as a function of an operating time period of the training combustion engine and successive values of the torque parameter during the operating time period during the training phase, of a simulated electric battery supplying electricity to the simulated electric motor; a symbol illustrating the implementation of the training phase.

8. The method according to claim 1, wherein the method comprises exiting the training phase, the regulation limit being equal to the nominal value after exiting the training phase.

9. The method according to claim 8, wherein the method comprises operating a human-machine exit interface of the control system, exiting the training phase being carried out in response to the operating of the human-machine exit interface.

10. The method according to claim 8, wherein exiting the training phase is engaged automatically:

when the speed of rotation of the training lift rotor is less than or equal to a first speed threshold and, at the same time, the height of the training rotorcraft is greater than a height threshold; or when the speed of rotation of the training lift rotor is less than a second speed threshold and, at the same time, the height of the training rotorcraft is less than or equal to the height threshold, the first speed threshold being greater than the second speed threshold.

11. The method according to claim 8, wherein exiting the training phase comprises assigning, to the regulation limit, a value that increases, during a transition phase, from the training value to the nominal value, according to a predetermined transition law.

12. A non-transitory computer-readable storage medium storing a computer program comprising instructions that, when the program is run by a control system, cause the control system to implement the method according to claim 1.

13. A training rotorcraft for training a pilot to enter an autorotation phase following an engine failure in a simulated rotorcraft, the training rotorcraft comprising a single training combustion engine for rotating a training lift rotor, wherein the training rotorcraft comprises a control system configured to implement the method according to claim 1.

14. A method for simulating an autorotation phase on a simulated rotorcraft comprising a simulated turboshaft engine for rotating a simulated lift rotor when no failure has occurred and a simulated electric motor for rotating the simulated lift rotor during the autorotation phase, wherein the method comprises a training phase carried out with a training rotorcraft, the training rotorcraft comprising a training turboshaft engine for rotating a training lift rotor, the training turboshaft engine regulated by a regulator of a control system, keeping a torque parameter of the training rotorcraft less than or equal to a regulation limit, the training phase comprising:

activating the training phase by operating a human-machine entry interface of the control system; and in response to the activating, assigning a stored training value to the regulation limit, by the regulator, and regulating the training turboshaft engine by the regulator, keeping the torque parameter of the training rotorcraft less than or equal to the regulation limit, the training value being less than a nominal value assigned to the regulation limit prior to the activating, so that the training turboshaft engine produces a power equal to a reference power produced by the simulated electric motor during an autorotation phase in the simulated rotorcraft.

15. A non-transitory computer-readable storage medium storing a computer program comprising instructions that, when the program is run by a control system, cause the control system to implement the method according to claim 14.

16. A training rotorcraft for training a pilot to enter an autorotation phase following an engine failure in a simulated rotorcraft, the training rotorcraft comprising a single training turboshaft engine for rotating a training lift rotor, wherein the training rotorcraft comprises a control system configured to implement the method according to claim 14.

17. The method according to claim 14, wherein the torque parameter is a driving power or an engine torque transmitted to a component of the training rotorcraft.

18. The method according to claim 14, wherein the training rotorcraft comprises a training electric motor capable of setting the training lift rotor in rotation and not used during the training phase or comprises only the training turboshaft engine for setting the training lift rotor in motion.

19. The method according to claim 14, wherein the regulating the training turboshaft engine comprises regulating the training turboshaft engine by applying a dedicated regulation law to the training phase, and inhibiting this regulation law as long as the torque parameter is greater than or equal to the training value.

20. The method according to claim 14, wherein the training rotorcraft comprises an instrument of the control system displaying an operating limit determined, when not in the training phase, by a display law as a function of the nominal value, the training phase comprising replacing the nominal value with the training value in order to determine the operating limit.

* * * * *